United States Patent Office 3,453,234
Patented July 1, 1969

3,453,234
LATENT CATALYST CONTAINING PLATINUM
AND SULFOXIDE
Gust J. Kookootsedes, Midland, Mich., assignor to Dow
Corning Corporation, Midland, Mich., a corporation
of Michigan
No Drawing. Filed Jan. 31, 1968, Ser. No. 701,841
Int. Cl. C08g 31/26, 47/08
U.S. Cl. 260—46.5                                    36 Claims

ABSTRACT OF THE DISCLOSURE

A curable organosilicon composition of an organosilicon polymer containing at least two monovalent aliphatic unsaturated hydrocarbon radicals, an organosilicon compound having at least two silicon-bonded hydrogen atoms, a platinum catalyst and an organic sulfoxide or an organosilicon sulfoxide, which is stable at room temperature but cures when heated, is disclosed. An example of an organic sulfoxide is dimethylsulfoxide and an example of an organosilicon sulfoxide is

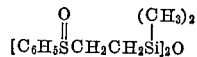

The organosilicon composition has increased stability at room temperature, but cures to rubbers and resins when heated.

---

This invention relates to a new heat activated curing system for organosilicon compounds wherein a latent catalyst containing platinum and sulfoxide is used.

Many articles of commerce based on organosilicon compounds are of the type that can be easily formed to a desired shape or applied to a desired area, after which the easily worked material is then cured to retain its desired configuration. For example, organopolysiloxane elastomers are normally supplied as formable materials ranging from thin pastes to stiff plastic dough-like materials. These materials are shaped by processes such as molding and extruding, after which the article is converted to the rubbery state by curing, a process often called vulcanization when applied to an elastomer. The article then retains its desired shape, or if deformed, will seek to return to its vulcanized, or cured configuration. Similarly, polysiloxane resins, obtainable as fluids, fusible solids and solutions are also formed or supplied and thereafter cured.

The curing methods employed for organosilicon compounds can be placed into two classes. The first are those that occur spontaneously at room temperature, exemplified by the curing systems such as described in U.S. Patents 2,833,742, 2,843,555, 2,902,467, 2,934,519 and 2,999,077. The second are those that require heat to activate the curing reaction, such as organic peroxides, and the various sulfur-type cures more commonly used in connection with organic rubber. The instant composition is of the latter type; that is, it is heat activated. The present system is similar to the curing system described in U.S. Patent 3,020,260, but differs therefrom in that the instant system is inactive at room temperature.

It is an object of the present invention to provide a novel useful heat activated curing system for organosilicon compounds.

Another object is to provide a curing system that can be incorporated into an organosilicon compound and that is inert at normal temperatures but cures upon heating a latent catalyst system. Still another object is to provide a system which has a slow rate of cure at room temperature.

A further object is to provide a curing system that is not inhibited by air or components of air.

A further object is to provide a heat activated cure for organosilicon compounds that imparts good stability to the cured system.

These and other objects will be apparent from the following detailed description.

The present invention relates to a curable organosilicon composition comprising (1) an organosilicon polymer having an average of from one to three groups per silicon atom selected from the group consisting of monovalent hydrocarbon radicals, aliphatic-unsaturtaion-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by divalent radicals selected from the group consisting of divalent oxygen atoms, divalent hydrocarbon radicals, divalent hydrocarbon ether radicals and divalent haloarylene radicals, said divalent radicals linking silicon atoms, (2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyano radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphtaic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-banded hydrogen atoms per molecule of (2) is at least 4, (3) a platinum catalyst in an amount of at least 0.1 part by weight platinum per million parts by weight of the combined weights of (1) and (2), and (4) a sulfoxide in an amount to effectively retard the cure at ambient temperatures, said sulfoxide being selected from the group consisting of (A) an organic sulfoxide of the formula $R_2SO$ wherein R is a monovalent hydrocarbon radical, and (B) an organosilicon compound having at least one unit of the formula

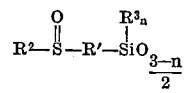

and any remaining units being of the formula

in which R' is a divalent aliphatic hydrocarbon radical, $R^2$ is a monovalent hydrocarbon radical, $R^3$ and $R^4$ are each monovalent radicals selected from the group consisting of hydrocarbon radicals, halohydrocarbon radicals and hydrocarbonoxy radicals, n is an integer of from 0 to 3 inclusive and m is an integer of from 0 to 3 inclusive.

Organosilicon compound (1) can be a resin, a fluid or a substantially non-flowing high polymer such as conventionally used in silicone rubber manufacture. Any monovalent hydrocarbon radical, halohydrocarbon radical or cyanoalkyl radical that can be used with organosilicon compounds as stated above is operable in component (1). Examples of monovalent hydrocarbon radicals that can be used include, for example, alkyl radicals such as methyl, ethyl, isopropyl, tert-butyl, octadecyl and myricyl; cycloalkyl radicals such as cyclopentyl and cyclohexyl; aralkyl radicals such as benzyl and 2-phenylethyl; aryl radicals such as phenyl, tolyl, xylyl, naphthyl, xenyl and anthracyl; and radicals containing aliphatic unsaturation such as vinyl, allyl, methallyl, ethynyl, butadienyl, cyclopentenyl, m-vinylphenyl and the like.

Any monovalent halohydrocarbon radical and cyanoalkyl radical can be used in (1), and include, for example, chloromethyl, 3,3,3-trifluoropropyl, 2,3-dibromocyclopentyl, iodophenyl, dichloronaphthyl, 2-cyanoethyl, 2-cyanopropyl, and omega-cyanooctadecyl.

In component (1) there must be an average per molecule of at least two radicals containing aliphatic unsaturation. These radicals enter into the curing reaction discussed below. More than two said radicals can be present, but a minimum of two (average per molecule) is necessary to obtain a cure to a coherent solid. When the average number of aliphatically unsaturated radicals per molecule is more than two, a correspondingly tighter cure is obtained.

The monovalent organic radicals in (1) can be the same or different. In addition, the aliphatically unsaturated radicals can be the same or different. As well, organosilicon compound (1) can be a copolymer, mixture of copolymers, mixtures of monomers and polymers, mixtures of monomers and copolymers and the like.

The remaining valences of the silicon atoms in organosilicon compound (1) are satisfied by divalent oxygen, divalent hydrocarbon radicals, divalent hydrocarbon ether radicals and divalent haloarylene radicals. Any one or more of the said divalent linkages can be present in component (1).

Examples of divalent radicals that can be used in component (1) include, for example, hydrocarbon radicals such as —CH$_2$—, —CH$_2$CH$_2$—, —(CH$_2$)$_{18}$—,

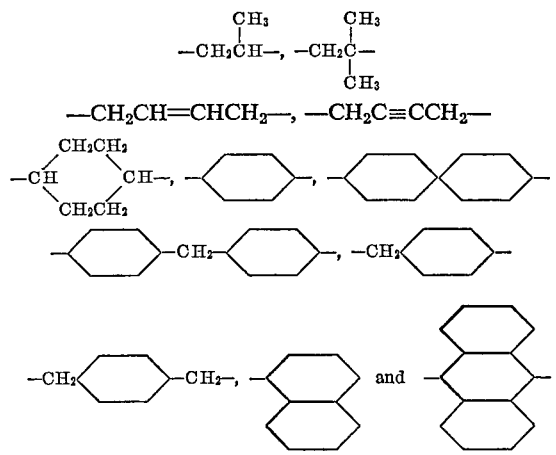

hydrocarbon ether radicals such as

—CH$_2$CH$_2$OCH$_2$CH$_2$—, CH$_2$CH$_2$CH$_2$OCH$_2$CH$_2$—
and

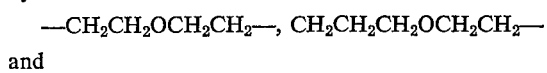

and haloarylene radicals such as

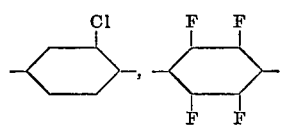

and

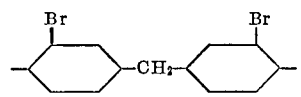

Any of the divalent linkages stated above can be present in component (1). However, where the average number of silicon atoms per molecule is greater than three, it is preferred when use of the finished product will include both extremely high and extremely low temperature exposure, that at least 50 percent of the divalent linkages be oxygen. This is not necessary, however, particularly when component (1) is a cyclic material.

Preparation of materials that can be component (1) are well known in the art. The monovalent radicals can be attached, for instance, by either the so-called "direct process," or via Grignard reaction, or in some cases by a pseudo Friedel-Crafts reaction. Other reactions normally used to introduce organic radicals can, of course, be also used. Silicon-bonded oxygen is introduced by hydrolysis of a hydrolyzable group on silicon (such as halogen, alkoxy or acyloxy), as is well known in the art. Divalent organic radicals can be introduced via Wurtz-type synthesis, Grignard, direct process, etc. The preparations of compounds suitable for use as component (1) are well known in the art and need not be recited herein.

Organosilicon compound (2) can be any organosilicon compound having silicon-bonded hydrogen atoms. It can contain two or more silicon-bonded hydrogen atoms per molecule and in addition an average of up to two monovalent radicals per silicon atom, as set forth above. These can include, for example, alkyl radicals such as methyl, ethyl, isopropyl, tert-amyl, octadecyl and myricyl; cycloalkyl radicals such as cyclopentyl and cyclohexyl; aralkyl radicals such as benzyl, β-phenylethyl and xylyl; and aryl radicals such as phenyl, tolyl, xenyl, naphthyl and anthracyl. In addition, monovalent halohydrocarbon radicals such as chloromethyl, 3,3,3-trifluoropropyl, α,α,α-trifluorotolyl, bromophenyl and 2,3-dibromocyclopentyl can be present in component (2). Also, cyanoalkyl radicals such as cyanoethyl and cyanobutyl can also be present. The organic radicals can be alike or different. Component (2) can be a homopolymer, a copolymer, a monomer or mixture of two or more of the foregoing, provided only that each is free of aliphatic unsaturation and each contain an average per molecule of at least two silicon-bonded hydrogen atoms.

The remaining valences of the silicon atoms of component (2) are satisfied from divalent oxygen, divalent hydrocarbon radicals free of aliphatic unsaturation (e.g. —CH$_2$—, —(CH$_2$)$_{18}$—, —CH$_2$CH(CH$_3$)—,

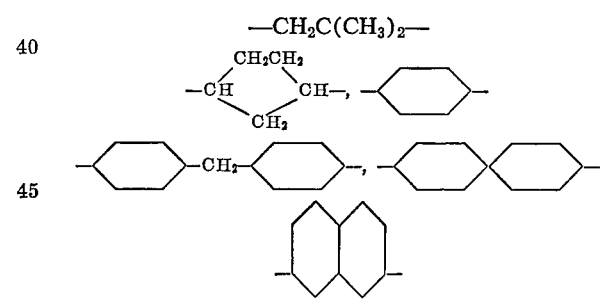

etc.), divalent hydrocarbon ether radicals free of aliphatic unsaturation (e.g., —CH$_2$CH$_2$OCH$_2$CH$_2$—,

—CH$_2$CH$_2$CH$_2$OCH$_2$CH$_2$—

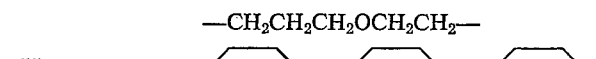

etc.), and divalent haloarylene radicals (e.g.

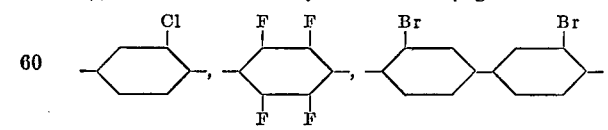

etc.). Any one or more of the above said divalent linkages can be present in component (2). As with component (1), when the average number of silicon atoms per molecule of (2) is greater than three it is preferred that at least 50 percent of the above divalent linkages be oxygen. This is not necessary, however, especially when component (2) is a cyclic material.

Preparation of materials that come within the definition of component (2) are well known in the art, and many examples of such materials are available commercially. Thus, recitation of methods of manufacture of these materials would be redundant herein.

The selection of components (1) and (2) is somewhat interrelated. When the average number of aliphatically unsaturated groups per molecule in component (1) is 2.0, a component (2) should be selected wherein the average number of silicon-bonded hydrogen atoms per molecule is at least 2.0, so that the total of these just defined quantities is at least 4. The analogous is true when the chosen component (2) contains 2.0 (average) silicon-bonded hydrogen atoms per molecule. When either component has the defined quantity greater than 2.0, selection of the other component on this basis is irrelevant. It should be understood, of course, that the higher the sum of these quantities, the more highly crosslinked can be the cured composition.

The molar ratio of aliphatic unsaturated radicals in (1) to the silicon-bonded hydrogen atoms in (2) can in some cases be an important consideration. Where it is important, the ratio of these two should be preferably between 0.67 and 1.5. However, there are many instances wherein a balance of these two quantities is unimportant. For example, if a component (1) has, say, an average of six aliphatic unsaturated groups per molecule, the use of equal molar amounts of silicon-bonded hydrogen atoms may well give a cure too highly crosslinked for the desired end use. Thus, less than, sometimes much less than, the equal molar amount of SiH would be used to provide the desired degree of cure. However, when maximum stability is required it is desirable to match the molar quantities of silicon-bonded hydrogen atoms in (2) to the aliphatic unsaturated radicals in (1).

Platinum compound (3) can be any of the known forms, ranging from platinum as such or as deposited on carriers such as silica gel or powdered charcoal, to platinic chloride, salts of platinum and chloroplatinic acid. Any of these forms will function in the instant curing system. A preferred form of platinum is the chloroplatinic acid either as the commonly obtainable hexahydrate or the anhydrous form, on account of its easy dispersability in organisilicon systems and its non-effect on color of the mixture. Additional platinum compounds which include, $PtCl_2[P(CH_2CH_2CH_3)_3]_2$, platinum bromides, a complex of platinous halide and an olefin such as ethylene, proylene, butylene, cyclohexene and styrene, $Pt(CH_3CN)_2Cl_2$,
$[Pt(CH_3CN)_2(CH_3)_4]Cl_2$,
$Pt(NH_3)_2Cl_2$,
$K[PtCl_3CH_2CH_2CH_2OH]$,
$PtBr_2(C_2H_4)_2$,
$K[PtBr_3(C_2H_4)]$,
$PtCl_2(C_2H_4)$,
$(CH_3)_2C=CH_2 \cdot PtCl_2$, $H_2Pt(CN)_4 \cdot 5H_2O$,
$H[PtCl_3(CH_3CN)]$,
$Pt(NH_3)_2(CNS)_2$,
$PtCl_2 \cdot PCl_3$,
$[Pt(NH_3)_4] \cdot [PtCl_4]$,
$PtCl_2[P(CH_2CH_3)_3]_2$,
$PtCl_2 \cdot P(OH)_3$,
$PtCl_2 \cdot P(OCH_2CH_3)_3$,
$PtCl_2 \cdot [P(OCH_2CH_3)_3]_2$,
$Pt(OOCH_2SCH_2CH_3)_2$,
$Pt(CN)_3$,
$(CH_3)_4Pt$,
$(CH_3)_3Pt-Pt(CH_3)_3$,

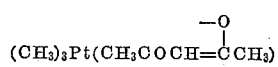

$PtCl_2CO$ and
$PtBr_2CO$.

There should be at least 0.1 part by weight platinum per million parts by weight of the combined total weight of (1) and (2). However, since impurities in the system may easily poison this small quantity of catalyst, it is preferred to employ from 1 to 20 parts per million, platinum. A greater amount of the platinum can be used, but does affect the requirement of component (4) below, and economic considerations suggest the lower amounts mentioned.

The key component in the present curable organosilicon composition is the sulfoxide compound. The sulfoxide can be either an organic sulfoxide or a sulfoxide containing organisilicon compound. The organic sulfoxide has a formula $R_2SO$ where R is a monovalent hydrocarbon radical. R includes hydrocarbon radicals in which two R radicals are bonded together to form a heterocyclic compound, such as

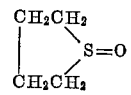

R is any monovalent hydrocarbon radical, such as methyl, ethyl, propyl, butyl, benzyl, phenyl, tolyl and tetramethylene where two R's are bonded together. In any one or ganic sulfoxide, the R radicals may be the same or different. Some specific examples of organic sulfoxides are dimethylsulfoxide, dibenzylsulfoxide, di-n-butylsulfoxide, diphenylsulfoxide, di-n-propylsulfoxide, tetramethylenesulfoxide, ditolylsulfoxide, methyltolylsulfoxide, ethylmethylsulfoxide and methylphenylsulfoxide. The organic sulfoxides can be obtained commercially and prepared by well-known methods.

The sulfoxide containing organosilicon compounds are described in copending U.S. patent application Ser. No. 529,234, filed Feb. 23, 1966, by John W. Ryan, now abandoned, which is hereby fully incorporated by reference. The method of preparing the sulfoxide containing organosilicon compounds is also described in detail in the Ryan application.

The organosilicon compounds contain at least one unit of the formula

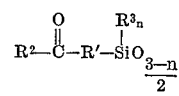

and any remaining units are of the formula $R^4{}_mSiO_{4-m/2}$ where $R'$ is a divalent aliphatic hydrocarbon radical, $R^2$ is a monovalent hydrocarbon radical, $R^3$ and $R^4$ are each monovalent radicals including hydrocarbon radicals, halohydrocarbon radicals and hydrocarbonoxy radicals, $n$ is 0 to 3 and $m$ is 0 to 3. $R'$ can be any divalent aliphatic hydrocarbon radical such as methylene, ethylene, propylene, butylene, amylene, hexylene, decylene, octadecylene, myricylene,

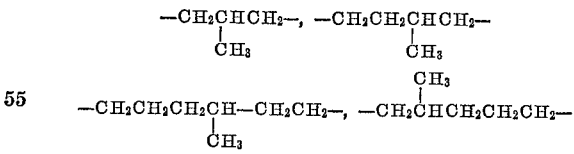

and

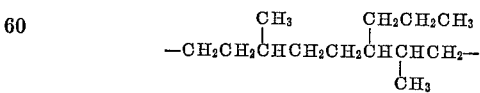

$R^2$ can be any monovalent hydrocarbon radical such as methyl, ethyl, propyl, isopropyl, butyl, isobutyl, t-butyl, dodecyl, octadecyl, myricyl, pentyl, isopentyl, hexyl, isohexyl, cyclohexyl, cyclopentyl, methylcyclohexyl, hexylcyclohexyl, cyclobutyl, cyclohexenyl, vinyl, octadecenyl, β-phenylpropyl, β-phenylethyl, benzyl, phenyl, tolyl, xylyl, ethylphenyl, mesityl, methylethylphenyl, n-propylphenyl, propylphenyl, isopropylphenyl, diethylphenyl, pentamethylphenyl, amylphenyl, butylmethylphenyl, propylmethylphenyl, ethyltrimethylphenyl, diethylmethylphenyl, hexylphenyl, cyclohexylmethylphenyl, amylmethylphenyl, butylethylphenyl, butyldimethylphenyl, propylethylmethylphenyl, diphenyl, dipropylphenyl, naphthyl, 1-methylnaphthyl, 2-methylnaphthyl, 1-ethylnaphthyl, 2-ethylnaphthyl, phenylnaphthyl, anthracyl, 9-methylanthracyl, 2,3-dimethylanthracyl, 2,4-dimethylanthracyl, 3-ethylanthracyl, phenanthryl, 3-methylphenanthryl, and 1,4-dimethylphenanthryl among others.

Since $R^3$ and $R^4$ are each monovalent hydrocarbon radicals they can also be represented by the above-listed examples of $R^2$. In addition, $R^3$ and $R^4$ can also each be a monovalent halohydrocarbon radical and a monovalent hydrocarbonoxy radical such as an alkoxy radical such as methoxy, ethoxy, propoxy, isopropoxy, butoxy, isobutoxy and hexoxy; aryloxy radicals such as phenoxy, xyloxy, 2-phenylethyloxy, and naphthyloxy; and a halohydrocarbon radical such as chlorobenzyl, iodo-β-phenylpropyl, chloromethyl, chlorobutyl, bromopropyl, 3,3,3-trifluoropropyl, gamma-chloropropyl, (perfluoroethyl)-ethyl, (perfluoropentyl)-ethyl, (perfluorononyl)ethyl, iodophenyl, α,α,α-trifluorotolyl, perfluorocyclohexenyl, bromophenyl, o-bromotolyl, m-bromotolyl, p-bromotolyl, o-chlorotolyl, m-chlorotolyl, p-chlorotolyl, 2-chloro-m-fluorotolyl, 2,6-chlorotolyl, 4-bromo-o-xylyl, dichloroxylyl, 5-bromo-m-xylyl, 2-bromo-p-xylyl, 2-bromomesityl, 3-bromo-o-tolyl, 2-bromo-1-ethylphenyl, 4-bromo-1,3-diethylphenyl, 4-bromo-1-tertiary-butylphenyl, 6-bromo-3-ethyltolyl, 2-bromo-4-ethyltolyl, 4-bromo-1-propylphenyl, 4-bromo-1-isopropylphenyl, 4-bromo-1-methyl-3-isopropylphenyl, 4-bromo-1-tertiary-ampylphenyl, chlorophenyl, α-bromophenyl, β-bromophenyl, 2-chloronaphthyl, 1-bromo-3-chloronaphthyl, 2-chloro-1-methylnaphthyl, 1-bromo-8-methylnaphthyl, 1-bromo-2,3-dimethylnaphthyl, 1-bromo-4-methylnaphthyl, 1,10-dibromo-anthracyl and 9,10-dichloroanthracyl.

The best method for obtaining the organosilicon sulfoxides is by oxidation of the corresponding organosilicon sulfide under gentle reaction conditions. A typical reaction comprises contacting the organosilicon sulfide with a stoichiometric amount of an aqueous solution of an oxidizing agent. An appropriate amount of alcohol such as methanol, ethanol, propanol, isopropanol, butanol, or isobutanol, among others, can be included in the above reaction although it is not required. The incorporation of alcohol is to merely facilitate the reaction since it insures solubility of the respective reactants. In the above method, both alcohol and the organosilicon sulfoxide are evolved with the solution being evaporated and the sulfoxide being collected under vacuum.

The term "gentle" reaction conditions as employed herein means that the reaction occurs in the absence of acid and at room temperature. It is preferred that the reaction be maintained at a slow, rather than a rapid rate. Thus, although heat and acid can be used to promote the reaction, it is preferred that acid be precluded and the reaction maintained at or near room temperatures.

The term "aqueous solution" as employed herein means that at least a portion by weight of the oxidizing agent is water. For best results a 20 to 40 percent aqueous solution of hydrogen peroxide is used although it is possible to obtain the organosilicon sulfoxides as defined herein when a range of from 10 to 90 percent of an aqueous solution of hydrogen peroxide is employed. It is to be noted that the oxidizing agent used is not restricted solely to hydrogen peroxide, but can include any oxidizing agent. For example, any peroxide such as hydrogen peroxide, ozone or any form of oxygen, permanganates such as potassium permanganate, chromates such as potassium dichromate, and nitrate salts such as sodium nitrate can be effectively utilized.

It is to be further noted that oxidation to the desired organosilicon sulfoxide need not occur in an aqueous solution, but can also be conducted under anhydrous conditions. Because, in certain instances, it may be advantageous to retain a hydrocarbonoxy group, on the silicon atom of the sulfide during the process of oxidation to the corresponding sulfoxide, oxidation in the absence of water is required. This can be achieved by selecting an oxidizing agent suitable for the purpose such as ozone or $N_2O_4$. Oxidation is accomplished in the absence of water, the sulfide being oxidized to form the sulfoxide with no apparent effect to the hydrocarbonoxy radical positioned on the silicon atom.

An illustrative example of the preparation of an organosilicon sulfoxide is as follows:

To 16.4 g. of

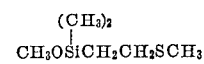

was added 11.3 g. of a 30 percent aqueous solution of hydrogen peroxide. The temperature was maintained below 20° C. and was stirred for two hours. The solution was then allowed to warm to room temperature and stood for forty hours. The solution was evaporated under vacuum and an organosilicon sulfoxide compound of the formula

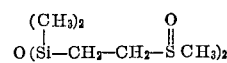

was obtained.

Specific examples of organosilicon sulfoxides useful in the present invention include the following illustrative examples:

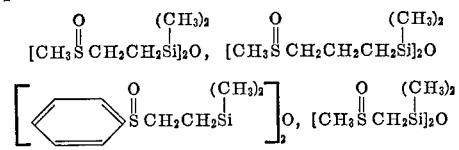

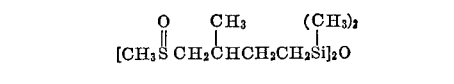

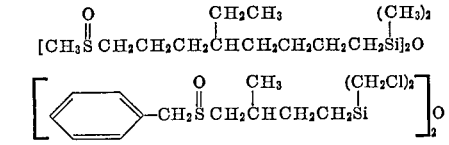

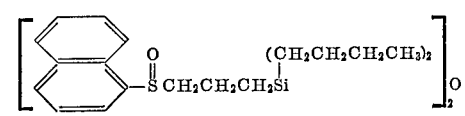

$$CH_3CH_2CH_2\overset{O}{\underset{\|}{S}}CH_2CH_2CH_2Si(CH_2CH_3)_3$$

a polymer of the unit formula

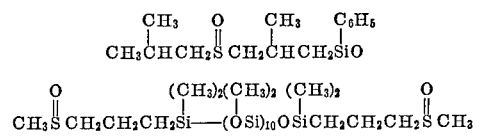

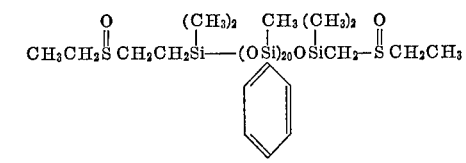

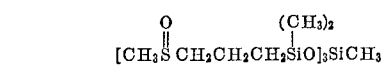

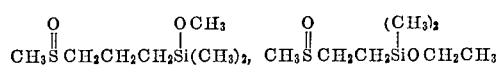

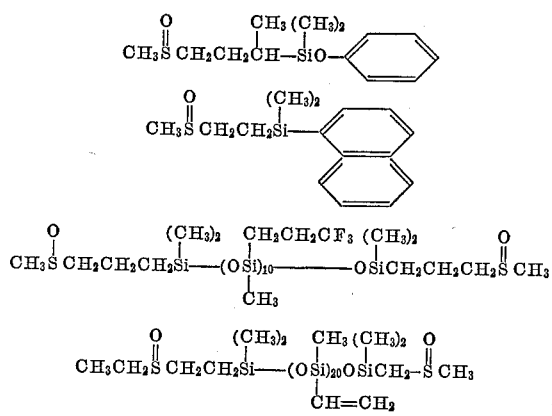

and a copolymer of 75 mol percent of the units of the formula

and 25 mol percent of units of the formula

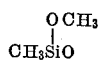

The addition of the sulfoxide, (4) to a composition comprising (1), (2) and (3) slows down the rate of cure at room temperature or completely prevents a cure at room temperature over long periods of time such as greater than 3 months, but at temperatures in excess of 70° C. the inhibiting effect of the sulfoxide observed at room temperature disappears and a normal curing rate is realized. The cure of the present composition can be retarded at room temperature for short periods of time or for very long periods of time by the proper amount of sulfoxide. No exact amount of sulfoxide can be suggested to give a specified storage life at room temperature. The rate of cure at temperatures up to 60° C. will depend upon the ratio of sulfoxide to platinum, the form of the platinum catalyst, the nature of the sulfoxide, the nature and amounts of ingredients (1) and (2) and the presence or absence of other non-essential ingredients. Sulfoxides added in small amounts such as about one mole sulfoxide per one mole of platinum provide increased pot life in all systems but, in most cases, do not fully retard the reaction at room temperature (up to about 60° C.) and in larger amounts such as about 2000 moles of sulfoxide per one mole of platinum, they provide completely inhibited cures in all systems at room temperature (up to about 60° C.). However, some systems are completely inhibited at room temperature at 1 mole of sulfoxide per one mole of platinum while others may require 10, 20, 50 or 1000 moles of sulfoxide per one mole of platinum to completely inhibit the system at room temperature. Also some systems are not completely inhibited at room temperature when 50, 200 or 1000 moles of sulfoxide per one mole of platinum are added. The amount of sulfoxide is therefore dependent upon the desired use, and the nature of the system. The skilled worker should therefore determine the optimum level of each system.

The amount of sulfoxide present is based on the amount of platinum. A suggested lower amount of sulfoxide in the composition is about one mole of sulfoxide per one mole of platinum to provide a useful slowing down of the rate of cure at room temperature. Amounts less than one mole of sulfoxide per one mole of platinum can be used, however, depending upon the composition more or less can be used to provide a significant increase in the pot life of the composition at room temperature. Larger amounts, 1000 to 2000 moles of sulfoxide per one mole of platinum can be used to completely inhibit the cure at room temperature over long periods of time. Considering the sulfoxides as a group, a range might be suggested of 1 to 2000 moles of sulfoxide per mole of platinum. However, the nature of each sulfoxide would suggest a preferred range for each individual sulfoxide. In this respect, the organic sulfoxides are preferably present in amounts of 500 to 2000 moles of sulfoxide per mole of platinum. The organosilicon sulfoxides are preferably present in amount of 1 to 200 moles sulfoxide per mole of platinum. The organic sulfoxides require larger amounts to provide equivalent retardation compared to the organosilicon sulfoxides. In this respect, it is preferred to use the organosilicon sulfoxides, since less sulfoxide is required to provide the same effect, the odor normally associated with sulfoxides is less offensive, and the volatility of the organosilicon sulfoxides is less. A preferred range for the group of sulfoxides is 20 to 2000 moles of sulfoxide per mole of platinum.

As shown above, the use of a sulfoxide can completely prevent room temperature cure of the present organosilicon composition or the sulfoxide can be used to slow down the rate of cure at room temperature. Slowing down the rate of cure at room temperature can be extremely useful such as wherein a particular combination of (1), (2) and (3) would cure in four hours at room temperature, the same combination with the proper amount of sulfoxide would require 24 hours to cure. This extra time before cure would allow the user a longer time to use the mixture for coating, dipping, etc., before any of the mixture cured. The inhibiting effect can be negated by heating the composition above 70° C. whereby the composition cures. Thus, the sulfoxide, which is the key ingredient of this invention, can be used to retard the room temperature cure or prevent the room temperature cure (infinite retardation) of a system which cures by the platinum catalyzed interaction of silicon-bonded hydrogen atoms with unsaturated aliphatic radicals on silicon.

The components of this invention can be mixed in any order. While the addition of the platinum without the sulfoxide will cause the beginning of interaction of components (1) and (2), the extent of reaction in a few minutes time at ordinary temperatures is negligible, within which time the sulfoxide will normally have been added. In systems where even this small amount of interaction might be deleterious, the sulfoxide can be added before the platinum. One method of mixing is to premix components (1) and (3), premix components (2) and (4), and then combine these two mixtures. Another method is to add the sulfoxide to component (1) and (2) and then add (3). A preferred method of mixing the ingredients is to mix (3) and (4). The resulting mixture of (3) and (4) provides a suitable catalyst mixture which can be stored and also added to either (1) or (2) or a mixture of (1) and (2) without any disadvantages. The advantages of mixing (3) and (4) are that the sulfoxide and the platinum catalyst are in intimate contact and the full effect of the retardation of the effectiveness of the platinum catalyst is realized, and the ratio of (3) and (4) can be easily regulated, that since ( 3) and (4) are in small amounts, the mixture can be more easily measured to provide greater accuracy in the amounts added, that many batches can be catalyzed exactly alike and that such a mixture is more easily adapted to a continuous process. Mixtures of (3) and (4) should be stored in the absence of heat, inasmuch as heat activates the system. However, a set order of addition of the ingredient is not necessary to the functioning of this curing system.

The system can be mixed just prior to use (contemplated cure) or can be mixed and stored for later use. One or more of the components can be omitted, provided only that when components (1), (2) and (3) are present, component (4) must also be present. In addition, the storage of a mixture of components (2) and (3) alone is not preferred, for should moisture be present or be introduced, an undesirable alternate reaction can occur. Thus, components (1), (2) and (4) can be stored together and component (3) added later, or (1), (3) and (4) to which (2) is added later, etc. Further, components (2), (3) and (4) can be conveniently stored together and added to component (1) when desired. Such a system is especially desirable in the silicon rubber field, wherein the diorganopolysiloxane polymers each have essentially the same amount of aliphatic unsaturation, wherefore the addition of components (2), (3) and (4) as a premixture is quite feasible.

As stated earlier, with sufficient sulfoxide the curing system is stable; that is, it does not cause curing of the organisilicon composition at ordinary temperatures. For instance, even at 49° C. (120° F.) a fluid composition coersponding to the instant invention with sufficient sulfoxide showed essentially no change in viscosity after 4 days. At 70° C., however, this same mixture was a vulcanized rubber after 24 hours, and at 150° C. it vulcanized within 10 minutes. Thus, the instant curing system is quite stable to about 50 to 60° C., well above ordinary temperatures.

The curing reaction is that of addition of an SiH of (2) to an unsaturated radical on silicon of (1). This is a well-known reaction, catalyzed by many other materials in addition to platinum. The addition of SiH to allyl on silicon serves to illustrate the reaction as follows:

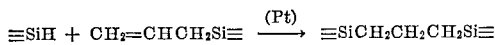

It is noteworthy that no byproducts are formed in the curing reaction. Thus, it is not necessary to cure the system under pressure as is the case when a curing system produces byproducts which are volatile. Further, it is unnecessary to carefully postbake the cured composition, as is necessary with most other heat activated curing systems now used in silicones. It is already well known that a curing system involving SiH and aliphatic unsaturated radicals need not be employed in a closed system. It is also well recognized that neither the extent of cure nor rate of cure are inhibited by air or components thereof.

In addition to the recited components, other materials can be present in a composition utilizing this curing catalyst system. Such materials as are ordinarily used in organosilicon compositions, such as fillers, (5), (carbon black, silica aerogels, silica soots, treated silicas, alumina, clays, metal oxides, metal carbonates, metal silicates, etc.), pigments to impart certain colors to the material, rubber additives such as compression set aids, plasticizers (both organosilicon and organic), etc., can be added to the instant composition. Materials that are known to poison platinum catalysts should of course be excluded, but these are not normally included in organosilicon compounds designed to be cured by heat activated curing catalysts.

The instant composition can be used for any application requiring a resin or rubber where heat activated curing is possible. One will immediately recognize the tremendously wide variety of applications herein included. The instant curing system can be activated in closed or open systems, in thin or thick sections and under pressure and at atmospheric pressure with equal ease merely by the application of heat above about 70° C., there being complete freedom from the undesirable sponging associated with some curing systems when pressure is not used, and freedom from uncured surface, obtained particularly with organic peroxides, when the composition is cured in the open exposed to the atmosphere. Thus, advantages of this particular system include excellent thick-section cure, absence of air-inhibiton, and therefore uniform cure throughout the sample. In addition, where desired, the system can serve to control (slow down) the rate of cure of a platinum catalyzed SiH— unsaturated aliphatic-on-silicon room temperature cure.

Particularly useful curable organosilicon compositions for many of the above uses are those having 45 to 75 inclusive weight percent of (1), 0.5 to 10 inclusive weight percent of (2), 20 to 50 inclusive weight percent of a filler, (5), where the weight percentages are based on the combined weights of (1), (2) and (5), and the described amounts of platinum catalyst and sulfoxide.

The following examples are illustrative only and should not be construed as limiting the invention which is properly delineated in the appended claims.

Example 1

(A) A 1% by weight platinum solution was prepared by mixing 0.663 g. of chloroplatinic acid hexahydrate and 24.337 g. of dimethylsulfoxide.

(B) Another solution containing 0.2% by weight platinum was prepared by mixing 3 g. of the solution (A) and 12 g. of dimethylsulfoxide.

(C) A potting composition was prepared containing 61.45 percent by weight of a methylphenylvinylsiloxy-endblocked polydimethylsiloxane having a viscosity of 2000 cps. at 25° C., 33.09 percent by weight of a benzene soluble resin consisting of vinyldimethylsiloxane units, trimethylsiloxane units and $SiO_2$ units and 5.45 percent by weight of a polysiloxane copolymer consisting of 19 mol percent dimethylhydrogensiloxane units, 1.0 mol percent trimethylsiloxane units, 49 mol percent dimethylsiloxane units and 31 mol percent methylhydrogensiloxane units. To 25 grams of the potting composition, enough of solution (A) was added to provide 14 parts by weight platinum per million parts by weight potting composition. To another 25 gram sample of the potting composition, enough of solution (B) was added to provide 10 parts by weight platinum per million parts by weight potting composition. The sample containing the (A) solution gelled in 24 hours after standing at room temperature whereas the sample containing (B) was still fluid after 2 months at room temperature.

Example 2

An organosilicon composition used as a molding compound contains a phenyl-methyl-siloxane resin having both silicon-bonded hydrogen atoms and vinyl radicals on the silocon atoms. Enough of solution (A) of Example 1 was added to 150 grams of the resin to provide 10 parts by weight platinum per million parts by weight resin. The resulting mixture was molded to a rigid solid by heating for 3 minutes at 300° F. Some of the mixture was stored at room temperature and remained fluid for more than 7 days without cross-linking.

Example 3

To 50 g. of the potting composition of Example 1 containing 7 parts by weight platinum per million parts by weight composition, the platinum having been added in the form of a chloroplatinic acid catalyst was mixed with 0.1 g. of dimethylsulfoxide. The mixture cured after 43.5 hours.

Example 4

A putty-like molding compound was made by mixing 150 g. of the resin described in Example 2, 346.5 g. of a 325 mesh silica filler, 1 g. of a release agent, 2.5 g. of a black pigment and 23 drops of the latent platinum catalyst of (B), Example 1. The product remained a putty for over 16 days, but cured to a rigid solid in 3 minutes when heated at 350° F.

Example 5

To 50 g. of a mixture of 35 weight percent of a benzene soluble resin consisting of vinyldimethylsiloxane units, trimethylsiloxane units, and $SiO_2$ units and 65 weight percent of a methylphenylvinylsiloxy-endblocked polydimethylsiloxane having a viscosity of 2000 cps. at 25° C. and 0.1 g. of a sulfoxide of the formula

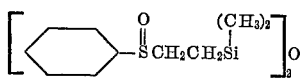

was prepared. To this mixture 5 g. of a mixture of 60 percent by weight of a polysiloxane copolymer as described in Example 1, 14 percent by weight of the benzene soluble resin described above, and 26 percent by weight of the methylphenylvinylsiloxy-endblocked polydimethylsiloxane described above was added. This mixture had a viscosity of 4400 cps. at 25° C. After 211 days at room temperature, this mixture had a viscosity of 5200 cps. at 250° C. The mixture cured to a void free solid after 15 minutes at 150° C.

Example 6

Mixtures were prepared as follows:
(A) 0.1 g. of $$C_6H_5\overset{O}{\underset{\|}{S}}CH_2CH_2\underset{\underset{CH_3}{|}}{\overset{\overset{CH_3}{|}}{Si}}O\underset{\underset{CH_3}{|}}{\overset{\overset{CH_3}{|}}{Si}}CH_2CH_2\overset{O}{\underset{\|}{S}}C_6H_5$$

was mixed with 55 g. of the potting mixture described in (C) of Example 1. This mixture was allowed to stand for one hour at room temperature before mixing into it 7 parts by weight platinum per million parts by weight of the mixture. The platinum was added as a chloroplatinic acid catalyst.

(B) 0.1 g. of $$[C_6H_5\overset{O}{\underset{\|}{S}}CH_2CH_2\underset{\underset{|}{(CH_3)_2}}{Si}]_2O$$

was mixed with 50 g. of a mixture of 35 percent by weight of a benzene soluble resin consisting of vinyldimethylsiloxane units, trimethylsiloxane units and SiO₂ units, and 65 weight percent of a methylphenylvinylsiloxy-endblocked polydimethylsiloxane having a viscosity of 2000 cps. at 25° C. This mixture was allowed to stand for one hour at room temperature. Thereafter, 7 parts by weight platinum per million parts by weight of the mixture was mixed therein. The platinum was added as a chloroplatinic acid catalyst. To this catalyzed mixture 5 g. of a mixture of 60 percent by weight of a polysiloxane copolymer as described in Example 1, 14 percent by weight of the benzene soluble resin described above and 26 percent by weight of the methylphenylvinylsiloxy-endblocked polydimethylsiloxane described above was added and mixed in.

(C) 0.1 g. of

was mixed with 5 g. of a mixture of 60 percent by weight of a polysiloxane copolymer as described in Example 1, 14 percent by weight of the benzene soluble resin described above and 26 percent by weight of the methylphenylvinylsiloxy-endblocked polydimethylsiloxane described above. This mixture was allowed to stand for one hour at room temperature. Thereafter, 7 parts by weight of platinum per million parts by weight of mixture was added to the mixture in the form of a chloroplatinic acid catalyst. To the catalyzed mixture, 50 g. of a mixture of 35 weight percent of the benzene soluble resin described above and 65 weight percent of the methylphenylvinylsiloxy-endblocked polydimethylsiloxane as described above was mixed in.

The viscosity was observed at various intervals over a period of time while the mixtures were stored at room temperature, the results are in the following table.

| Sample | Viscosity at 25° C. in cps. after— | | | |
|---|---|---|---|---|
|  | 0 hrs. | 17.5 hrs. | 89.5 hrs. | 457 hrs. |
| (A) | 3,600 | 3,600 | 4,000 | 3,920 |
| (B) | 3,600 | 3,680 | 4,400 | 4,080 |
| (C) | 3,600 | 3,520 | 4,000 | 4,080 |

The viscosity was a Brookfield viscosity using Spindle No. 4 at 10 r.p.m.

Example 7

(A) A mixture as described in Example 1, (C) was prepared.

(B) A mixture of 55 g. of the mixture described in Example 1, (C), and 0.1 g. of

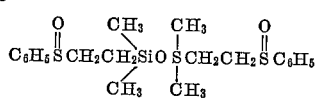

was prepared.

(C) A mixture of 27.5 g. of (A) above, 27.5 g. of (B) above, and 6 parts by weight platinum per million parts by weight of the mixture was prepared. The platinum was added in the form of a chloroplatinic acid catalyst.

(D) A mixture of 41.25 g. of (A) above, 13.75 g. of (B) above and 6 parts by weight platinum per million parts by weight mixture was prepared. The platinum was added in the form of a chloroplatinic acid catalyst.

(E) A mixture of 48.125 g. of (A) above, 6.875 g. of (B) above and 6 parts by weight platinum per million parts by weight mixture was prepared. The platinum was added in the form of a chloroplatinic acid catalyst.

The viscosity of each sample was observed at various intervals over a period of time while the mixtures were stored at room temperature. The results are in the following table.

| Sample | Viscosity at 25° C. in cps. after— | | | | | |
|---|---|---|---|---|---|---|
|  | 0 hrs. | 7 hrs. | 23 hrs. | 103 hrs. | 192 hrs. | 463 hrs. |
| (C) | 3,600 | 3,920 | 5,400 | 11,800 | 21,000 | 30,160 |
| (D) | 3,600 | 6,440 | Cured |  |  |  |
| (E) | 3,600 | 11,280 | Cured |  |  |  |

Example 8

(A) A mixture as described in Example 1, (C) was prepared.

(B) A mixture of 55 g. of (A) above and 0.4824 g. of $$[CH_3\overset{O}{\underset{\|}{S}}CH_2CH_2CH_2\underset{\underset{|}{(CH_3)_2}}{Si}]_2O$$

was prepared.

(C) A mixture of 55 g. of (A) above and 0.2950 of

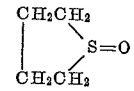

was prepared.

(D) A mixture of 55 g. of (A) above and 0.2136 g. of dimethylsulfoxide was prepared.

(E) A mixture of 27.5 g. of (A) above, 27.5 g. of (B) above and 6 parts by weight platinum per million parts by weight mixture was prepared. The platinum was added in the form of a chloroplatinic acid catalyst.

(F) A mixture of 41.25 g. of (A) above, 13.75 g. of (B) above and 6 parts by weight platinum per million parts by weight mixture was prepared. The platinum was added in the form of a chloroplatinic acid catalyst.

(G) A mixture of 48.12 g. of (A) above, 6.88 g. of (B) above and 6 parts by weight platinum per million parts by weight mixture was prepared. The platinum was added in the form of a chloroplatinic acid catalyst.

(H) A mixture of 27.5 g. of (A) above, 27.5 g. of (C) above and 6 parts by weight platinum per million parts by weight mixture was prepared. The platinum was added in the form of a chloroplatinic acid catalyst.

(I) A mixture of 27.5 g. of (A) above, 27.5 g. of (D) above and 6 parts by weight platinum per million parts by weight mixture was prepared. The platinum was added in the form of a chloroplatinic acid catalyst.

The viscosity of the above mixtures were observed at various intervals over a period of time while the mixtures were stored at room temperature. The results are in the following table.

| Sample | 0 hrs. | 17.5 hrs. | 42.5 hrs. | 142.5 hrs. |
|---|---|---|---|---|
| (E) | 3,600 | 3,720 | 3,800 | 3,680 |
| (F) | 3,600 | 3,720 | 3,800 | 3,800 |
| (G) | 3,600 | 5,200 | 6,050 | 7,800 |
| (H) | 3,600 | 9,600 | 54,000 | Cured |
| (I) | 3,600 | 24,400 | Cured | |

Example 9

Platinum containing solutions were prepared to give a 0.2 percent by weight solution of platinum.

Solution A                                             G.
H$_2$PtCl$_6$·6H$_2$O _____ 0.027
(CH$_3$)$_2$S=O _____ 4.973

Solution B
H$_2$PtCl$_6$·6H$_2$O _____ 0.027
Tetramethylenesulfoxide _____ 4.973

Mixture A was prepared by mixing 55 g. of the mixture of Example 1, (C), and 0.165 g. of Solution A.

Mixture B was prepared by mixing 55 g. of the mixture of Example 1, (C), and 0.165 g. of Solution B.

The initial viscosities of both Mixture A and Mixture B was 3,600 cps. at 25° C. After 7.5 hours at room temperature both Mixture A and Mixture B had a viscosity of 3,680 cps. at 25° C. After 34.5 hours at room temperature Mixture A had a viscosity of 3,920 cps. at 25° C. and Mixture B had a viscosity of 4,000 cps. at 25° C. After 13 days at room temperature Mixture A had a viscosity of 13,200 cps. at 25° C. and Mixture B had a viscosity of 6,000 cps. at 25° C.

Example 10

The effectiveness of the individual sulfoxides in retarding the curing was observed in the following example. The following solutions were prepared by mixing 3.0 g. of propylene carbonate with equal molar amounts of the sulfoxides as indicated in the following table.

| | Sulfoxide | Grams |
|---|---|---|
| 1 | Dimethylsulfoxide | 0.1068 |
| 2 | Tetramethylenesulfoxide | 0.1425 |
| 3 | Diphenylsulfoxide | 0.2769 |
| 4 | [CH$_3$S(O)CH$_2$CH$_2$CH$_2$Si(CH$_3$)$_2$]$_2$O | 0.2412 |
| 5 | [C$_6$H$_5$S(O)CH$_2$CH$_2$Si(CH$_3$)$_2$]$_2$O | 0.2412 |
| 6 | Blank | |

Each of the above solutions, 1–5, contained 0.000457 mole of sulfoxide per gram of solution.

A mixture of 50 g. of a mixture of 35 weight percent of a benzene soluble resin consisting of vinyldimethylsiloxane units, trimethylsiloxane units and SiO$_2$ units and 65 weight percent of a methylphenylvinylsiloxy-endblocked polydimethylsiloxane having a viscosity of 2,000 cps. at 25° C. and 1 g. of each of the above solutions. The mixtures were allowed to stand at room temperature for 0.5 hour and then 5 g. of a mixture of 60 percent by weight of the polysiloxane copolymer described in Example 1, (C), 14 percent by weight of the benzene soluble resin described above, 26 percent by weight of the methylphenylvinylsiloxy-endblocked polydimethylsiloxane described above, was mixed into the composition. The final mixtures were allowed to stand at room temperature and the viscosity was observed at various intervals over a period of time.

| Sample containing sulfoxide No. | Viscosity at 25° C. in cps. after— | | | | |
|---|---|---|---|---|---|
| | 0 hrs. | 23.25 hrs. | 95.25 hrs. | 815 hrs. | 1,534 hrs. |
| 1 | 4,400 | Cured | | | |
| 2 | 4,400 | Cured | | | |
| 3 | 4,400 | Cured | | | |
| 4 | 4,560 | 10,520 | Cured | | |
| 5 | 4,240 | 4,680 | | 4,600 | 5,000 |
| 6 | 4,400 | Cured | | | |

Example 11

Two siloxane mixtures are prepared of the following composition:

SILOXANE MIXTURE A 100 parts by weight of a dimethylvinylsiloxy-endblocked dimethylpolysiloxane having a viscosity of 2,500 cps. at 25° C., 30 parts by weight of calcined diatomaceous earth, 25 parts by weight of fine particle size zirconium silicate, 1 part by weight of butylcarbitol acetate containing 0.19 percent by weight platinum as chloroplatinic acid.

SILOXANE MIXTURE B 100 parts by weight of the same dimethylpolysiloxane as in Siloxane Mixture A, 120 parts by weight of calcined diatomaceous earth, 25 parts by weight of fine particle size zirconium silicate, 40 parts by weight of a mixture of iron oxide in a hydroxylated low viscosity dimethylpolysiloxane, there being 10 percent by weight of iron in the mixture, 59.5 parts by weight of a trimethylsiloxy-endblocked methylhydrogenpolysiloxane having an average per molecule of 10 silicon atoms.

For Sample C, 100 parts by weight of Siloxane Mixture A and 4 parts by weight of Siloxane Mixture B are mixed and within 24 hours at room temperature the Sample C cured to a rubber.

For Sample D, 100 parts by weight of Siloxane Mixture A, 4 parts by weight of Siloxane Mixture B and 0.0027 parts by weight of

are mixed. Sample D remains fluid for over 24 hours when stored at room temperature but cures to a solid when heated at 150° C.

Example 12

When any of the following polysiloxanes are substituted for the dimethylpolysiloxane in Siloxane Mixture A and the mixtures are made per Sample D as in Example 11, mixtures which are stable at room temperature over extended periods of time, but which cure when heated, are formed.

(a) A methylphenylallylsiloxy-endblocked methyl-3,3,3-trifluoropropylpolysiloxane having a viscosity of 50,000 cs. at 25° C.

(b) A dimethylcyclopentenylsiloxy - endblocked copolymer containing about 50 mol percent ethylmethylsiloxane units, 5 mol percent octadecylmethylsiloxane units, 20 mol percent 2-phenylethylmethylsiloxane units and 25 mol percent units of the formula

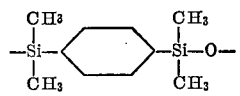

and having a viscosity of 250,000 cs. at 25° C.

(c) A mixture of (1) 10 parts of 2-butynyldimethylsiloxy endblocked β-cyanoethylmethylsiloxane fluid having a viscosity of 700 cs. at 25° C. and (2) 90 parts of a hydroxy endblocked copolymer containing 98 mol percent chlorophenylmethylsiloxane units and 2 mol percent vinylethylsiloxane units, having a viscosity of 550 cs. at 25° C.

(d) A vinyldimethylsiloxy-endblocked copolymer containing 70 mol percent dimethylsiloxane units, 10 mol percent diphenylsiloxane units, 5 mol percent benzylmethylsiloxane units and 15 mol percent units of the formula

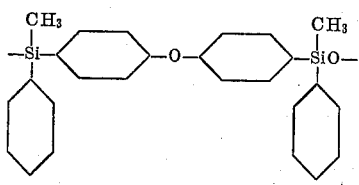

and having a viscosity of 25,000,000 cs. at 25° C.

(e) A copolymer containing 89.86 mol percent dimethylsiloxane units, 0.14 mol percent methylvinylsiloxane units and 10 mol percent units of the structure $-(CH_3)_2SiCH_2Si(CH_3)_2O-$, having a Williams plasticity of 0.100 inch.

Example 13

When equivalent quantities of the following organosilicon compounds are substituted for the methylhydrogenpolysiloxane of Siloxane Mixture B and the resulting mixture is used as in Sample D of Example 11, similar results are obtained:

(a)
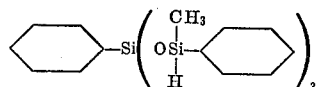

(b)
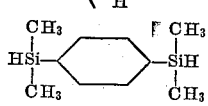

(c)
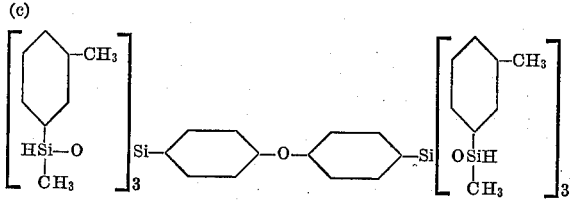

(d)
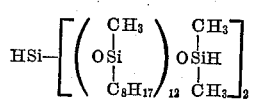

(e) A copolymer containing 40 mol percent of $$C_6H_5SiO_{3/2}$$

units, 40 mol percent cyclohexylmethylsiloxane units, 18 mol percent of 2-phenylpropylmethylsiloxane units, and 2 mol percent of methylhydrogensiloxane units having a viscosity of 500 cs. at 25° C.

(f) A mixture containing 10 parts of

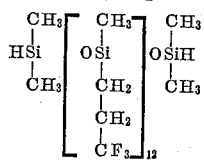

85 parts of

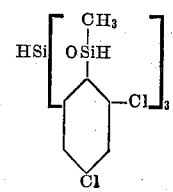

and 5 parts of

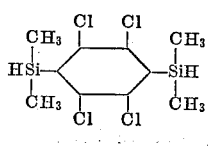

Example 14

When sufficient diphenylsulfoxide is added to the following mixture, the resulting composition is stable at ordinary temperatures, but can be cured to a coherent solid by heating at a temperature above 70° C. until the desired cure is obtained:

100 g. of a phenylmethylhydrogensiloxy-endblocked dimethylpolysiloxane having a viscosity of 100,000 cs. at 25° C., 2.0 g. of a fluid copolymer of the average composition

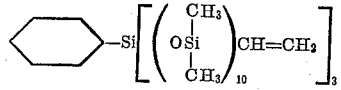

0.002 g. of platinum added as a solution of platinum sulfate in ethanol.

Example 15

When the following compositions are prepared by thoroughly mixing, the composition is stable at room temperature, but cures to a solid upon heating to 90° C.

(A)

45 parts by weight of a dimethylvinylsiloxy endblocked dimethylpolysiloxane gum, 50 parts by weight of a silica filler, 5 parts by weight of a trimethylsiloxy endblocked polymethylhydrogensiloxane fluid having a viscosity of 60 cs. at 25° C., 0.0001 part by weight of a platinum added as $$H_2Pt(CN)_4 \cdot 5H_2O$$

and, 0.166 part by weight of di-n-butylsulfoxide.

(B)

49.5 parts by weight of a siloxane polymer having 45 mol percent dimethylsiloxane units, 2 mol percent dimethsiloxane units, 31 mol percent phenylmethylsiloxane units, 20 mol percent benzylmethylsiloxane units and 2 mol percent monomethylsiloxane units, 0.5 part by weight of a compound of the formula

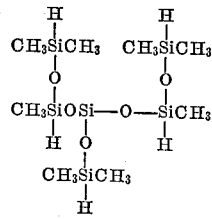

40 parts by weight of a fume silica, 10 parts by weight of finely divided quartz, 0.00025 part by weight platinum added as $Pt(NH_3)_2Cl_2$ and 0.515 part by weight di-n-propylsulfoxide.

(C)

75 parts by weight of a hydroxy endblocked polydimethylsiloxane gum containing 0.2 mol percent methylvinylsiloxane units, 5 parts by weight of a tetramethyldihydrogendisiloxane, 20 parts by weight of a silica treated with trimethylsiloxy groups, 0.0008 part by weight platinum added as $PtCl_2(C_2H_4)$ and 0.943 part by weight dibenzylsulfoxide.

(D)

60 parts by weight of a dimethylvinylsiloxy endblocked polydiorganosiloxane having 60 mol percent dimethylsiloxane units, 35 mol percent cyclohexylmethylsiloxane units, 4 mol percent diphenylsiloxane units and 1 mol percent phenylvinylsiloxane units and having a viscosity of 50,000 cs. at 25° C.

30 parts by weight of a fume silica,
10 parts by weight of a polymer of the average formula (CH₃)₃SiO[(CH₃)₂SiO]₆₂[(CH₃)HSiO]₈Si(CH₃)₃

0.001 part by weight of platinum added as chloroplatinic acid, and
0.590 part by weight of ditolylsulfoxide.

(E)

50 parts by weight of a dimethylvinylsiloxy endblocked polydimethylsiloxane having a viscosity of 100 cs. at 25° C.,
25 parts by weight of finely divided quartz,
6 parts by weight of

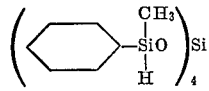

4 parts by weight of fume silica,
0.0009 part by weight of platinum added as chloroplatinic acid, and
0.780 part by weight of

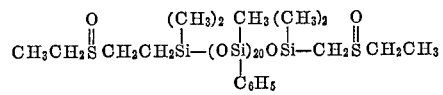

(F)

45 parts by weight of a dimethylvinylsiloxy endblocked dimethylpolysiloxane gum,
50 parts by weight of a silica filler,
5 parts by weight of a trimethylsiloxy enblocked polymethylhydrogensiloxane fluid having a viscosity of 60 cs. at 25° C.,
0.00005 part by weight platinum added a chloroplatinic acid, and
0.00099 part by weight

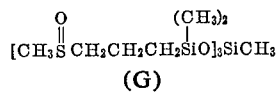

(G)

45 parts by weight of a dimethylvinylsiloxy endblocked dimethylpolysiloxane gum,
50 parts by weight of a silica filler,
5 parts by weight of a trimethylsiloxy endblocked polymethylhydrogensiloxane fluid having a viscosity of 60 cs. at 25° C.,
0.0005 part by weight platinum added as chloroplatinic acid, and
0.00056 part by weight

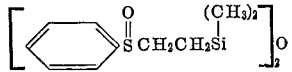

That which is claimed is:

1. A curable organosilicon composition comprising
(1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by divalent radicals selected from the group consisting of divalent oxygen atoms, divalent hydrocarbon radicals, divalent hydrocarbon ether radicals and divalent haloarylene radicals, said divalent radicals linking silicon atoms,
(2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4,
(3) a platinum catalyst in an amount of at least 0.1 part by weight platinum per million parts by weight of the combined weights of (1) and (2), and
(4) a sulfoxide in an amount to effectively retard the cure at ambient temperatures, said sulfoxide being selected from the group consisting of (A) an organic compound of the formula R₂SO wherein R is a monovalent hydrocarbon radical and (B) an organosilicon compound having at least one unit of the formula

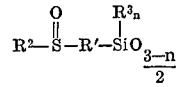

and any remaining units being of the formula

in which R' is a divalent aliphatic hydrocarbon radical, R² is a monovalent hydrocarbon radical, R³ and R⁴ are each monovalent radicals selected from the group consisting of hydrocarbon radicals, halohydrocarbon radicals and hydrocarbonoxy radicals, n is an integer of from 0 to 3 inclusive and m is an integer of from 0 to 3 inclusive.

2. The curable organosilicon composition according to claim 1 wherein (1) is a triorganosiloxy-endblocked polydiorganosiloxane having a viscosity of at least 100 cs. at 25° C.

3. The curable organosilicon composition according to claim 2 wherein the radicals of (1) are methyl and vinyl.

4. The curable organosilicon composition according to claim 2 wherein the radicals of (1) are methyl, phenyl and vinyl.

5. The curable organosilicon composition according to claim 2 wherein the radicals of (1) are methyl, 3,3,3-trifluoropropyl and vinyl.

6. The curable organosilicon composition according to claim 1 wherein the sulfoxide is present in an amount of at least one mole of sulfoxide per mole of platinum.

7. The curable organosilicon composition according to claim 6 wherein the sulfoxide is present in an amount of 20 to 2000 inclusive moles of sulfoxide per mole of platinum.

8. The curable organosilicon composition according to claim 1 wherein the sulfoxide is the organic compound, (A).

9. The curable organosilicon composition according to claim 8 wherein the organic compound, (A), is dimethylsulfoxide.

10. The curable organosilicon composition according to claim 8 wherein the organic compound, (A), is tetramethylenesulfoxide.

11. The curable organosilicon composition according to claim 1 wherein the sulfoxide is the organosilicon compound, (B).

12. The curable organosilicon composition according to claim 11 wherein the organosilicon compound, (B), is

13. The curable organosilicon composition according to claim 11 wherein the organosilicon compound, (B) is

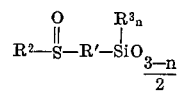

14. The curable organosilicon composition according to claim 2 wherein (4) is the organosilicon compound, (B).
15. The curable organosilicon composition according to claim 3 wherein (4) is the organosilicon compound, (B).
16. The curable organosilicon composition according to claim 4 wherein (4) is the organosilicon compound, (B).
17. The curable organosolicon composition according to claim 5 wherein (4) is the organosilicon compound, (B).
18. The curable organosilicon composition according to claim 6 wherein (4) is the organosilicon compound, (B).
19. The curable organosilicon composition according to claim 18 wherein the organosilicon compound, (B), is present in an amount of from 1 to 200 moles of (B) per mole of platinum.
20. The curable organosilicon composition according to claim 19 wherein (B) is

21. The curable organosilicon composition according to claim 1 wherein (3) is chloroplatinic acid.
22. The curable organosilicon composition according to claim 2 wherein (3) is chloroplatinic acid.
23. The curable organosilicon composition according to claim 6 wherein (3) is chloroplatinic acid.
24. The curable organosilicon composition according to claim 9 wherein (3) is chloroplatinic acid.
25. The curable organosilicon composition according to claim 11 wherein (3) is chloroplatinic acid.
26. The curable organosilicon composition according to claim 12 wherein (3) is chloroplatinic acid.
27. The curable organosilicon composition according to claim 13 wherein (3) is chloroplatinic acid.
28. The curable organosilicon composition according to claim 19 wherein (3) is chloroplatinic acid.
29. A method for curing an organosilicon composition comprising
(I) mixing
  (1) an organosilicon polymer having an average of from one to three groups per silicon atom selected from the group consisting of mono valent hdyrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by divalent radicals selected from the group consisting of divalent oxygen atoms, divalent hydrocarbon radicals, divalent hydrocarbon ether radicals and divalent haloarylene radicals, said divalent radicals linking silicon atoms,
  (2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation, and cyanoalkyl radicals, the remaining valences of the silicon atoms being satisfied by divalent radicals selected from the group consisting of divalent oxygen atoms, divalent hydrocarbon radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4,
  (3) a platinum catalyst in an amount of at least 0.1 part by weight platinum per million parts by weight of the combined weights of (1) and (2), and
  (4) a sulfoxide in an amount to effectively retard the cure at ambient temperatures, said sulfoxide being selected from the group consisting of (A) an organic compound of the formula $R_2SO$ wherein R is a monovalent hydrocarbon radical (B) an organosilicon compound having at least one unit of the formula

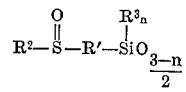

and any remaining units being of the formula $$R^4_mSiO_{4-m/2}$$

in which R' is a divalent aliphatic hydrocarbon radical, $R^2$ is a monovalent hydrocarbon radical, $R^3$ and $R^4$ are each monovalent radicals selected from the group consisting of hydrocarbon radicals, halohydrocarbon radicals and hydrocarbonoxy radicals, $n$ is an integer of from 0 to 3 inclusive and $m$ is an integer of from 0 to 3 inclusive.
(II) heating the resulting mixture of (I), above 70° C. whereby a coherent solid is obtained.
30. A method for preparing a curable organosilicon composition comprising
(III) mixing
  (3) a platinum catalyst in an amount of at least 0.1 part by weight platinum per million parts by weight of the combined weights of (1) and (2), and
  (4) a sulfoxide in an amount to effectively retard the cure at ambient temperatures, said sulfoxide being selected from the group consisting of (A) an organic compound of the formula $R_2SO$ wherein R is a monovalent hydrocarbon radical and (B) an organosilicon compound having at least one unit of the formula

and any remaining units being of the formula $$R^4_mSiO_{4-m/2}$$

in which R' is a divalent aliphatic hydrocarbon radical, $R^2$ is a monovalent hydrocarbon radical, $R^3$ and $R^4$ are each monovalent radicals selected from the group consisting of hydrocarbon radicals, halohydrocarbon radicals and hydrocarbonoxy radicals, $n$ is an integer of from 0 to 3 inclusive and $m$ is an integer of from 0 to 3 inclusive,
(IV) mixing
  (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by divalent radicals selected from the group consisting of divalent oxygen atoms, divalent hydrocarbon radicals, divalent hydrocarbon ether radicals and divalent haloarylene radicals, said divalent radicals linking silicon atoms.

(2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4, (V) combining the resulting mixtures of (III) and (IV) and thereafter thoroughly mixing whereby a homogeneous mixture is obtained.

31. The method for preparing a curable organosilicon composition in accordance with claim 30 wherein (3) is chloroplatinic acid and (4) is dimethylsulfoxide.

32. The method for preparing a curable organosilicon composition in accordance with claim 30 wherein (3) is chloroplatinic acid and (4) is

33. A latent catalyst consisting essentially of a mixture of
    (3) a platinum catalyst,
    (4) a sulfoxide in an amount of at least one mole sulfoxide per mole of platinum, said sulfoxide being selected from the group consisting of (A) an organic compound of the formula $R_2SO$ wherein R is a monovalent hydrocarbon radical and (B) an organosilicon compound having at least one unit of the formula

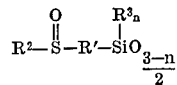

and any remaining units being of the formula $$R^4{}_m SiO_{4-m/2}$$

in which R' is a divalent aliphatic hydrocarbon radical, $R^2$ is a monovalent hydrocarbon radical, $R^3$ and $R^4$ are each monovalent radicals selected from the group consisting of hydrocarbon radicals, halohydrocarbon radicals and hydrocarbonoxy radicals, $n$ is an integer of from 0 to 3 inclusive and $m$ is an integer of from 0 to 3 inclusive.

34. The latent catalyst according to claim 33 wherein (3) is chloroplatinic acid and (4) is dimethylsulfoxide.

35. The latent catalyst according to claim 33 wherein (3) is chloroplatinic acid and (4) is

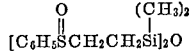

36. The latent catalyst according to claim 33 wherein (3) is chloroplatinic acid and (4) is

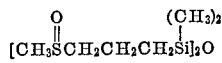

References Cited

UNITED STATES PATENTS

| | | | |
|---|---|---|---|
| 3,188,299 | 6/1965 | Chalk | 260—46.5 |
| 3,188,300 | 6/1965 | Chalk | 260—46.5 |
| 3,192,181 | 6/1965 | Moore | 260—46.5 |

DONALD E. CZAJA, *Primary Examiner.*

M. I. MARQUIS, *Assistant Examiner.*

U.S. Cl. X.R.

260—37, 429, 448.2, 825